United States Patent [19]

DeMars

[11] Patent Number: 5,554,225

[45] Date of Patent: *Sep. 10, 1996

[54] DEVICE FOR DISPENSING THIXOTROPIC MATERIALS

[75] Inventor: Jimmy A. DeMars, Hugo, Minn.

[73] Assignee: The Pillsbury Company, Minneapolis, Minn.

[*] Notice: The term of this patent shall not extend beyond the expiration date of Pat. No. 5,445,674.

[21] Appl. No.: 406,444

[22] Filed: Mar. 20, 1995

Related U.S. Application Data

[63] Continuation of Ser. No. 260,555, Jun. 16, 1994, Pat. No. 5,445,674, which is a continuation of Ser. No. 847,944, Mar. 6, 1992, abandoned.

[51] Int. Cl.$^6$ ............................................. B05C 5/00
[52] U.S. Cl. .................. 118/669; 118/684; 118/686; 118/602; 118/315; 118/326; 118/16; 118/25; 222/318; 222/109; 222/424; 137/563; 137/883; 99/450.1; 99/487
[58] Field of Search ........................ 118/669, 674, 118/684, 686, 687, 703, 602, 315, 326, 16, 25, 698; 222/318, 109, 424; 137/563, 883; 99/450.1, 487

[56] References Cited

U.S. PATENT DOCUMENTS

| | | | |
|---|---|---|---|
| 1,341,447 | 5/1920 | Timm | 137/563 |
| 2,022,481 | 11/1935 | Schellenger | 137/563 |
| 3,123,265 | 3/1964 | Houser | 225/19 |
| 3,164,490 | 1/1965 | Evanson et al. | 118/25 |
| 3,602,154 | 8/1971 | Schimkat et al. | 107/1 R |
| 3,715,061 | 2/1973 | Morine et al. | 222/334 |
| 3,722,560 | 5/1973 | Morine et al. | 141/172 |
| 3,734,356 | 5/1973 | Morine et al. | 222/199 |
| 3,885,471 | 5/1975 | Morine et al. | 74/611 |
| 3,892,171 | 7/1975 | Fitch et al. | 99/450.7 |
| 3,908,584 | 9/1975 | Raque | 118/25 |
| 3,961,755 | 6/1976 | Morine et al. | 239/319 |
| 4,018,367 | 4/1977 | Morine et al. | 222/485 |
| 4,043,294 | 8/1977 | Morine et al. | 118/9 |
| 4,145,990 | 3/1979 | Hochandel et al. | 118/2 |
| 4,170,883 | 10/1979 | Varner | 118/697 |
| 4,249,353 | 2/1981 | Berry | 52/232 |
| 4,421,800 | 12/1983 | Schoenberg et al. | 118/684 |
| 4,566,506 | 1/1986 | Cramer et al. | 118/25 |
| 4,615,264 | 10/1986 | Rose | 99/450.4 |
| 4,685,387 | 8/1987 | Hanson et al. | 99/450.4 |
| 4,686,902 | 8/1987 | Allain et al. | 137/563 |
| 4,983,109 | 1/1991 | Miller et al. | 222/318 |
| 5,121,677 | 6/1992 | LeClaire et al. | 118/25 |
| 5,121,857 | 6/1992 | Hutchinson | 222/318 |
| 5,445,674 | 8/1995 | DeMars | 118/669 |

FOREIGN PATENT DOCUMENTS

| | | | |
|---|---|---|---|
| 396845 | 11/1990 | European Pat. Off. | 118/669 |
| 1945949 | 4/1970 | Germany | 118/684 |
| 2504578 | 8/1975 | Germany . | |
| 3234963 | 3/1984 | Germany | 118/669 |
| 3709846 | 10/1988 | Germany | 118/669 |
| 1118660 | 7/1968 | United Kingdom . | |
| 1262472 | 2/1972 | United Kingdom . | |

*Primary Examiner*—Laura Edwards
*Attorney, Agent, or Firm*—Charles J. Ungemach; Aleya Rahman

[57] ABSTRACT

A fluid dispenser for use in consistently depositing relatively thick and lumpy materials onto receiving surfaces which employs a supply path to a plurality of pump/valve combinations and a feedback pressure line to assure an adequate pressure at the point of deposit. There are positive displacement pumps which operate continuously through the plurality of valves with an additional feedback path to assure constant flow of the material.

14 Claims, 3 Drawing Sheets

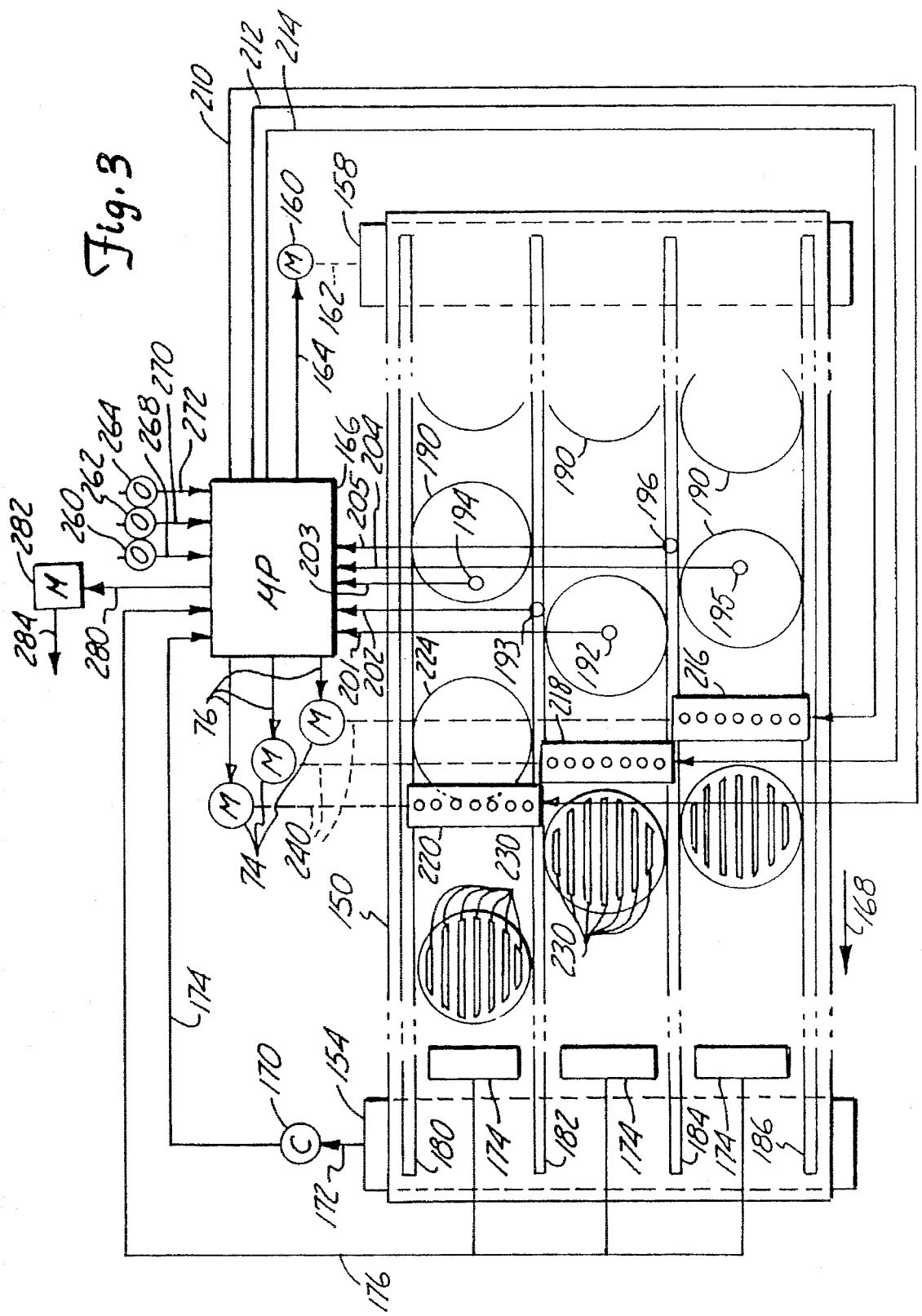

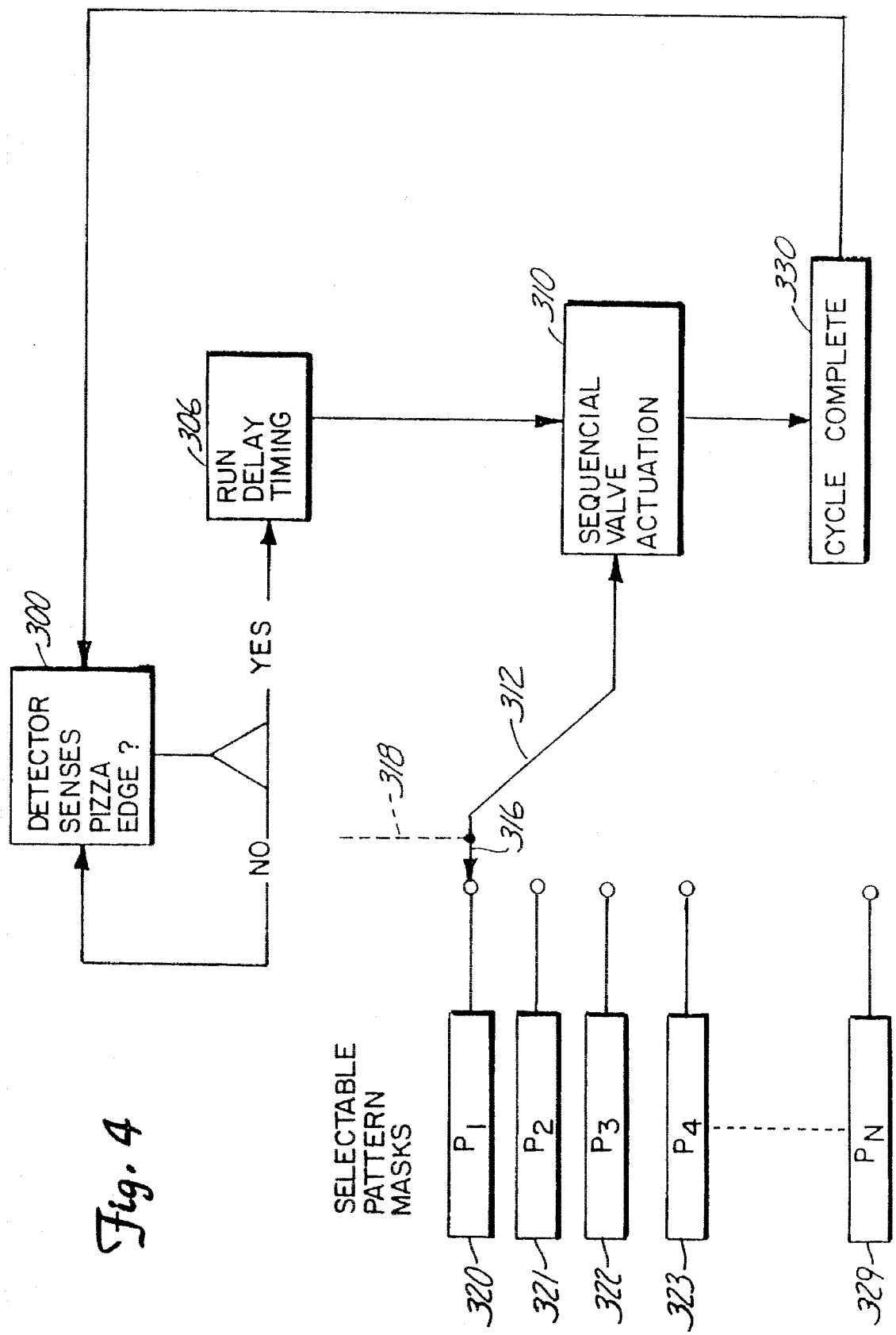

DEVICE FOR DISPENSING THIXOTROPIC MATERIALS

This application is a continuation of application Ser. No. 08/260,555, filed Jun. 16, 1994, now U.S. Pat. No. 5,445,674 which is a continuation of application Ser. No. 07/847,944, filed Mar. 6, 1992, now abandoned.

BACKGROUND OF THE INVENTION

1. Field of the Invention

The present invention relates to fluid dispensers and more particularly to dispensers for relatively thick mixtures such as sauces for foods sometimes containing lumps. The invention finds particular utility in dispensing materials such as tomato sauce onto pizza crusts in an assembly line production where a plurality of pizza crusts are caused to move past the dispenser and to have an fixed amount of tomato sauce distributed over their surface.

2. Description of the Prior Art

Examples of dispensers presently known in the art may be seen in, for example, U.S. Pat. No. 3,602,154 issued Aug. 31, 1971 to E. H. Schimkat et al. Such devices employ a supply tank which feeds the food products such as pizza sauce to a plurality of pistons which force the sauce into a plurality of valves located above a dispensing area. A conveyor belt moves the pizza crusts to the dispensing area and the pizzas are then lifted and rotated underneath the valve to apply the sauce thereto. Such apparatus is extremely difficult to manage, has no ability to easily change the size of the pizzas being processed and requires that the pizzas be evenly placed on the conveyor system at known location in order to operate properly.

The assignee of the present invention has devised a system in which the pizzas may moved under a dispensing area past a plurality of detectors which sense their presence and a signal is provided to a computer which also receives an input indicative of the speed of the conveyor and accordingly knows the moment that the leading edge of the pizza crust arrives in a dispensing area. The computer controls the opening of the appropriate valves as the pizza crust moves through the dispensing area so that the sauce from the tank is pumped through one or more orifices and onto the crusts for the length of time necessary to lay a plurality of strips thereon. As the pizza crust moves out of the dispensing area, the appropriate valves are closed and thereafter the strips of sauce tend to flow together as the crust continues to move so as to leave a relatively even surface of sauce thereon.

Systems such as described above have encountered a number of problems particularly when the fluid is a tomato sauce to be dispensed onto an object such as a pizza crust. For example, tomato sauce is known to act in a thixotropic manner; that is having a tendency to resist flowing until it is agitated to start. Accordingly, low flow usually occurs upon starting and uneven flow of sauce to crust results. The importance of this is found in fact that previous systems require a 20% or more excess target flow to assure at least a predetermined quantity of sauce is provided to each pizza. Not only is the extra cost of sauce significant but inconsistent pizzas result. It has been found that the pizzas which have excess sauce variation do not meet customer expectations of a uniform product. Accordingly, it is extremely desirable to provide sauce to the pizzas in a consistent manner.

Another problem encountered in prior art systems is blockage in one or more nozzles because of the fact that the sauces being dispensed may contain particles of spice or tomato. When this occurs, a number of pizza crusts may have one or more strips of sauce missing before an operator notices the discrepancy and corrects the blocked valve by applying an excess pressure thereto to blow the blockage away. Because of this, time has been wasted and several pizza crusts have to be discarded. To minimize this problem, the prior art has needed to have larger than desirable valve nozzles and this has produced a poor spread of sauce.

Another difficulty encountered in the prior art arises when there is insufficient pressure to assure continuous full flow conditions. When this occurs, one or more of the valves do not receive enough sauce and uneven and inconsistent applications result.

Prior art dispensing systems have also been unable to handle different set-up arrangements and can handle only one pizza size at a time. It is desirable to be able to sometimes use a single lane, sometimes two and sometimes three or more lanes and to handle different size crusts (5,7,9,11 & 12 inch pizzas are common) without having to change the valve positions.

SUMMARY OF THE INVENTION

The present invention while useful in various sorts of dispensers will be described in the embodiment where a tomato sauce is dispensed onto pizza crusts. In the present invention an improved dispenser is provided which overcomes the problems encountered in the prior art. Continuous flow to the valves is assured by providing a by-pass flow path through which a portion of the flow always occurs and accordingly, the initial flow problem with a "thixotropic" material does not occur. Also, back pressure is provided in the bypass path to provide a reverse pressure and assure that the sauce is always under sufficient pressure to the metering pumps. A unique positive displacement pump utilizing non-food contaminating materials such as stainless steel is provided which feeds the flow to the valves in a manner which tends to prevent blockage in the valves and, if blockage does occur, the pressure in that line builds up to blow it free because each nozzle has its own pump. Also, in the present invention, the valves are opened and closed by a computer in such a manner that any combination of them may be employed in order to accommodate different size pizza crusts and different numbers of parallel paths for the pizza crusts.

BRIEF DESCRIPTION OF THE DRAWINGS

FIG. 3 shows a top view of a part of the production line for dispensing sauce onto a plurality of pizzas; and FIG. 4 is a flow diagram for the computer sequence.

DETAILED DESCRIPTION OF THE PREFERRED EMBODIMENTS

Figure 1:
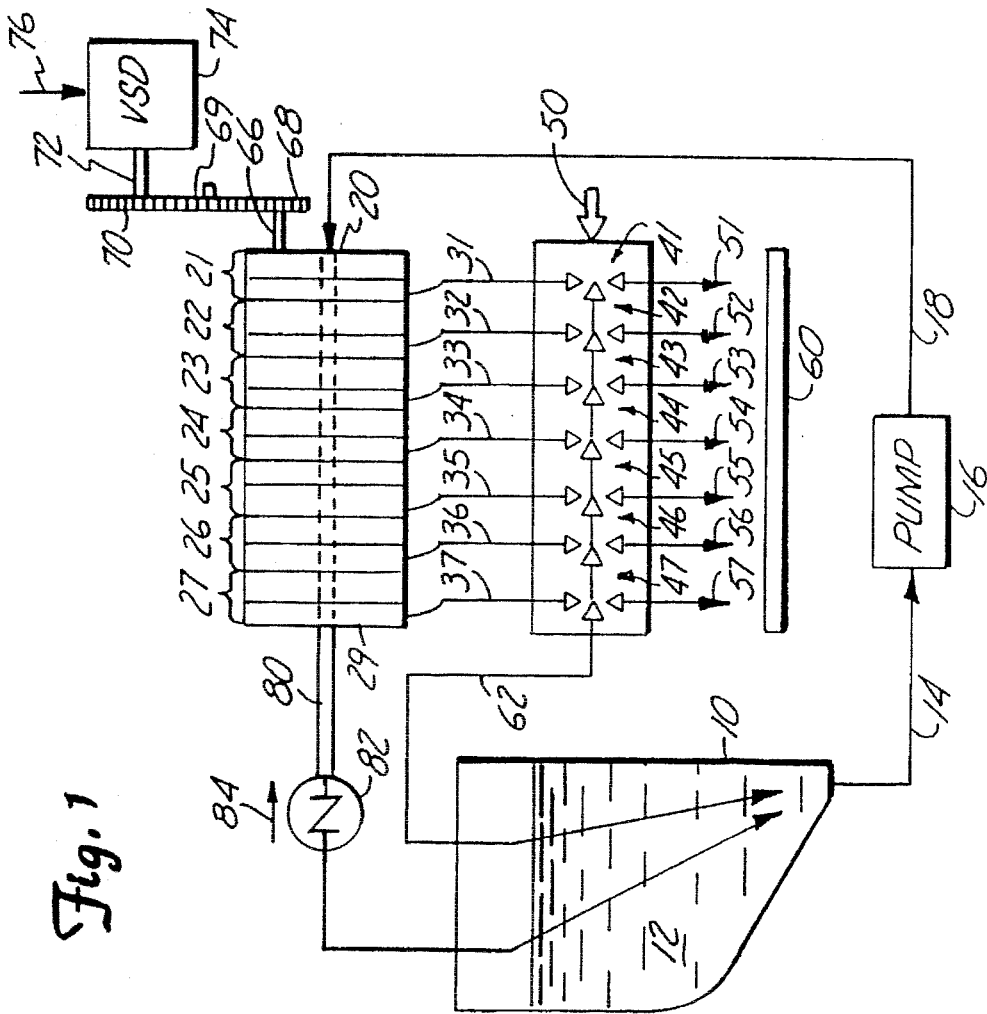
FIG. 1 shows a schematic flow diagram for the feed paths.

In FIG. 1, a supply tank 10 is shown containing a quantity of material 12 which, in the present example, may be tomato sauce for application to the surface of pizza crusts although it should be understood that the present invention may be used in a variety of applications with a number of other materials.

A feed line 14 is shown emerging from the bottom of the supply tank 10 and leading to a pump 16. Pump 16 drives the sauce through a supply line 18 to the input port 20 of a plurality of gear driven pumps 21–27 connection with FIG. 2, pumps 21–27 are provided with two sections, one of which contains a pair of gears to drive the sauce through a port to the other section where it moved downwardly in FIG. 1 through a plurality of outputs 31–37 to a like plurality of electrically actuated valves 41–47. It should be understood that while FIG. 1 shows 7 pump/valve combinations, this is primarily for ease in the description and in actual practice, any number may be used. It should also be noted that for food dispensing a non-food contaminating material such as stainless steel is preferred for constructing the pumps and other parts of the system which come in contact with the food.

Each valve may be independently turned "on" and "off" by an electrical input shown by arrow 50 which is controlled by a micro processor or computer better seen in FIG. 3. When "on", the full flow of the sauce supplied by the pumps 21–27 will pass through the valves and will flow downwardly through supply ports shown by arrows 51–57 in FIG. 1 so as to deposit the sauce onto the surface of a pizza crust 60 passing underneath. When turned "off", all of the sauce from pumps 21–27 will pass through valves 41–47 to a first return line 62. This constant motion of the sauce prevents the shear thinning problem of thixotropic type materials. It should be noted that the first return line 62 extends back to the supply tank 10 and down through the material 12 to a position near the bottom outlet. The reason for this is to assure that the sauce which has just been through the system will be the first used and thus prevents a build-up of the early or used sauce in tank 10.

It should also be noted that should any of the valves become blocked, the pump associated therewith will continue to pump and the pressure will build up to "blow" the blockage out. An example of a multipump apparatus, (although not previously used for food processing, is a hydraulics flow divider supplied by Delta Power Hydraulic Company of Rockford, Ill.

Figure 2:
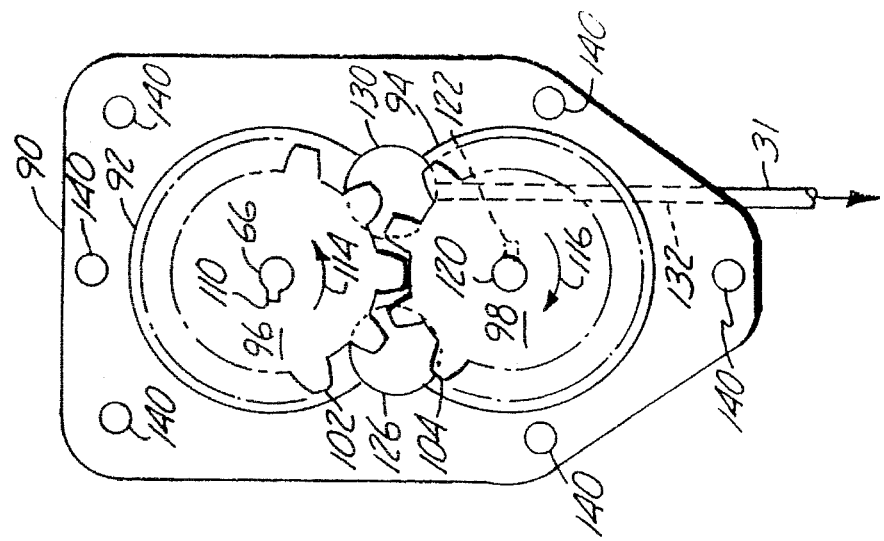
FIG. 2 shows a cut away section of one gear driven pump.

Returning to gears 21–27, it is seen that they are all driven by a shaft 66 which extends through the stack 29 and is keyed to the center of each gear to provide positive drive as will be better seen in connection with FIG. 2. In FIG. 1, shaft 66 is driven by gears 68, 69 and 70 from a shaft 72 driven by a variable speed motor 74 receiving an input shown by arrow 76 which is controlled by the computer to be described in connection with FIG. 3.

The sauce supplied through input port 20, in addition to flowing through pumps 21–27 and valves 41–47, flows through the stack and emerges in a second return line 80. Return line 80 includes a valve 82 which provides a backpressure, shown by arrow 84, to assure that there is always sufficient pressure to cause sauce to fill the pumps 21–27 and valves 41–47. After leaving valve 82, the sauce is fed back to the supply tank 10 and through the material 12 to near the bottom of the tank 10 to assure it is used first for the next flow around. Approximately 10–20 percent of the flow from pump 16 through input port 20 is fed back to tank 10 via the second return line 80 even when all of the valves 41–47 are "on", and again the constant motion of the sauce helps prevent the "thixotropic" problem.

Referring now to FIG. 2, a gear section for one of the pumps 21–27 is shown comprising a flat slab 90 of material such as stainless steel and containing first and second large apertures 92 and 94 sized to provide space for a pair of gears 96 and 98 to rotate. Apertures 92 and 94 are overlapping so that the teeth, such as shown by reference numerals 102 and 104 on gears 96 and 98 respectively, will mesh in the center portion. It is seen that the upper gear 96 is driven by shaft 66 described in connection with FIG. 1 and is keyed as at point 110 to be caused to rotate in a direction shown by arrow 114. Gear 98 is driven by gear 96 to rotate in a direction shown by arrow 116 around a shaft 120. Shaft 120 is only keyed to one of the gears in stack 29 as is shown by dashed line 122 so that the shaft will turn within the bearings as opposed to the gears turning on the shaft. All of the other gears in the stack 29 are mounted to be able to float on shaft 120.

The entrance port 20 is shown in FIG. 2 as an aperture 126 which extends into the plane of FIG. 2 and all the way through the stack 29. An exit port is shown by aperture 130 and this extends into the plane of FIG. 2 only so far as to join a port in an adjacent slab of material shown by dashed line 132 which extends down to emerge as one of the lines such as 31 in FIG. 1 leading to valve 41. It should be understood that each pump is composed of two slabs of material joined together as by bolts extending through the stack of gears. A final end plate closes the side of the last element. Apertures such as shown by reference numerals 140 are used to accommodate such bolts. In each set of two slabs, the first one includes an output duct such as 132 in FIG. 2, and the other one contains the gears like that shown in FIG. 2. The back of the next set of two slabs covers the side of its neighbor to prevent sauce from flowing out.

It is seen in FIG. 2 that sauce enters the pump through aperture 126, is driven through the gears 96 and 98 where they mesh and is forced out of aperture 130 to exit port 31 and to the appropriate valve 41 in FIG. 1. If valve 41 is open, all of the sauce is then deposited on the pizza crust. It should be noted that other positive displacement pumps may be employed in place of those shown in FIG. 2, e.g. a G-Rotor Pump.

Referring now to FIG. 3, a top view of a system for depositing sauce onto pizza crusts is shown. A conveyor surface 150, which may be in the form of a belt or mesh is shown passing around rollers 154 and 158. One of the rollers, 158 in FIG. 3, is driven by a motor 160 through a mechanical linkage shown as dashed line 162. Motor 160 is driven at a speed set by the magnitude of an input signal shown by arrow 164 from a micro processor or computer 166. The surface 150 is shown driven by motor 160 in a direction shown by arrow 168 and the speed of surface is sensed by a counter 170 connected to roller 154 by a line shown as arrow 172. A signal indicative of this speed is sent to micro processor 166 via a line shown as arrow 174 and is used by the microprocessor 166 to control the speed of motor 160 and assure that the surface 150 is moving at an exact desired speed.

A plurality of paths for pizza crusts are formed by movable edges or fences 180, 182, 184 and 186 placed by the operator in accordance with the size of the pizza and the number of channels desired. While three such channels are shown, with different sized pizzas or if fewer or more channels were desired, the channels formed by the fences 180 etc. can easily be changed.

A plurality of pizza crusts such as shown by reference numerals 190 are fed onto the surface 150 by any conventional means (not shown) and then they move with the surface 150 in the channels formed by fences 180 etc. A plurality of detectors, such as optical detectors 192–196 are spaced out across the width of surface 150 and operate to detect the presence of an oncoming pizza crust at an exact known location. While five detectors are shown in FIG. 3, fewer or more may be employed. It should be noted that only three of the five detectors need be used for the three channels shown in FIG. 3 (i.e. detectors 192, 194 and 195). The other detectors 193 and 196 would be for use if a different set up with different size pizzas or a different number of channels were employed. It should also be noted that the position of the detectors need not be centered on a channel, as shown, nor need the detectors be evenly spaced. It is only necessary that the micro processor know the position of the detectors.

When a detector senses the oncoming pizza crust, it sends a signal to the micro processor 166 via lines such as shown by arrows 201–205. The micro processor 166, knowing the speed of the surface and the position of the pizza crust, sends valve operating signals out via lines such as shown by arrows 210, 212 and 214 to the valves which are shown in FIG. 3 as three groups of seven valves in boxes 216, 218 and 220 which are mounted above the moving surface 150. Accordingly, just when the leading edge of a pizza crust starts to pass under a valve box such as is shown in FIG. 3 by a pizza crust 224 starting under box 220, the valve centered on the pizza is opened and sauce start to form a strip over the crust as it moves. Shortly thereafter, the computer opens the two valves on either side of the center one and then the next two so that a plurality of sauce strips are put down in the pattern shown by the dark strips 230. As the pizza crust starts to leave the area, the computer closes the outer valves, then the next etc. and last, the center valve and valves, to assure that the deposition is as even as possible over the pizza crust and does not flow onto the conveyor surface. After deposition as strips 230, the sauce tends to flow together to form a relatively uniform surface of sauce and because of the exact control of the valves, there is little variation in quantity from one pizza to another. It has been found that no more than 12% by weight and as little as 3% variation is found in the application of sauce thus assuring the desired uniformity.

Micro processor 166 also controls the variable speed drive motors 74 via lines shown as arrows 76 which were described in connection with FIG. 1 and these motors operate the pumps through the gear drives shown as dashed lines 240 in FIG. 3.

Micro processor also includes a plurality of operator controlled inputs shown by knobs 260, 262 and 264 providing input signals shown by arrows 268, 270 and 272 to micro processor 166. These are representative of inputs by the operator to inform the micro processor of, for example, the desired speed of the surface 150, the number of channels to be used, the size of the pizza crusts to be sauced, and/or the rate of sauce flow which can be controlled by varying the relative speeds of the variable speed drive 74 and the motor 160.

Micro processor 166 also receives an input from a plurality of output analyzing devices 174 which may be optical scanners to detect if the sauce is being put on properly and if not, to alert the operator to the problem so that it may be corrected at an early point in time. Outputs from devices 174 are shown as a line 176 to microprocessor 166. It may also be desirable to provide other detectors such as weighing devices (not shown) at points on the surface 150 before and after the application of sauce to the pizza crusts. Signals from the weighing devices would be sent to the microprocessor 166 to provide exact information as to the quantity of sauce being applied.

Finally, micro processor 166 is shown having an output represented by an arrow 280 to a memory 282 which operates to store system performance information such as the number of pizzas processed, the size, the amount of sauce and/or any other facts about which the operator would like to be kept informed. This information may be presented to a display (not shown) via a line shown by arrow 284.

Referring to FIG. 4, a flow diagram, the sequence of operation of computer 166 is shown for one line of oncoming pizza crusts. Similar diagrams would be used for each one of the paths and each would be independently operated. A detector 300 observing the moving surface keeps looking for the pizza and if it is not seen inquires again. When it determines that a pizza crust has reached a predetermined position, a signal to a Run Delay Timer box 306 is actuated. Run Delay Timer 306 knows the speed of the surface, via connection 174 in FIG. 3, and knows the position of the detector 300 with respect to the valves and accordingly knows the delay necessary before actuating the valves. At the determined time, a signal is sent to a Sequential Valve Actuation box 310 which also knows the speed of the surface and determines the proper sequence for actuating the valves. To this end, an input is provided via a line 312 which is connectable by a switch mechanism shown schematically by arrow 316 and dashed line 318 to one of a plurality of mask patterns P1–Pn identified by reference numerals 320–329. Each pattern provides a signal indicative of a particular sized pizza crust e.g. 6", 8", 10" etc. so that sequential valve 310 can determine the number of valves to use and their proper sequence. For example, assume a 6" pizza required 7 stripes of sauce to cover the pizza. The sequencer, knowing the speed of the surface would activate valve number 4 in a central group of seven valves to start depositing the center stripe. Shortly thereafter valves 3 and 5 would be activated followed by 2 and 6 and finally 1 and 7 would be activated for a short time. Thereafter, valves 1 and 7 would be deactivated, then 2 and 6, 3 and 5 and finally valve 4 as the pizza crust left the area under the valves. At this time a signal to a Cycle Complete box 330 would cause a signal to the Detector 300 to begin the next cycle.

It is thus seen that I have provided an improved dispensing device which overcomes the problems encountered in the prior art. Although the present invention has been described with reference to preferred embodiments, workers skilled in the art will recognize that changes may be made in form and detail without departing from the spirit and scope of the invention.

What is claimed is:

1. Apparatus for dispensing a thixotropic food onto a food surface comprising:

source means for providing a continuous supply of the thixotropic food;

conveyor means for transporting the food surface past a dispensing position;

a dispensing port mounted above the dispensing position;

valve means having "on" and "off" conditions and an input port and first and second output ports;

flow conducting means connecting the input port to the source means to receive a supply of the thixotropic food therefrom, the first output port connected to the dispensing port to deposit the thixotropic food on the food surface as it passes through the dispensing position, said flow conducting means including a positive displacement pump means connected to the source means to move the thixotropic food therefrom to the input port;

first return means connected to the second output port and to the source means to provide a first path to return excess thixotropic food to the source means and to provide continuous motion of the thixotropic food through the valve means;

second return means connected to the flow conducting means and to the source means to provide a constant second path independent from the first path to return excess thixotropic food to the source means and to provide continuous motion of the thixotropic food in the flow conducting means, the provision of continuous motion operating to overcome the thixotropic tendency to resist motion;

flow restriction means connected to the second return means to provide a back pressure to assure continuous flow to the valve means;

position sensing means operable to produce a signal indicative of the position of the food surface with respect to the dispensing position;

computer means capable of receiving the signal indicative of position and operable to control the "on" condition of the valve means in accordance therewith;

connecting means to connect the conveyor means to the computer means so that the speed of the conveyor means is controlled by the computer means;

speed sensing means in communication with the computer means to produce an output signal indicative of the speed of the conveyor means and to supply the output signal to the computer means; and food surface and thixotropic food sensing means for supplying an output indicative of the number of food surfaces and a quantity of thixotropic food and connecting it to the computer means.

2. Apparatus according to claim 1 further including memory means connected to the computer means to store the information indicative of the number of food surfaces and the quantity of thixotropic food.

3. Apparatus for dispensing a thixotropic food onto a plurality of food surfaces moveable along a plurality of lanes, comprising:

source means for providing a continuous supply of the thixotropic food;

conveyor means with a variable speed for transporting the plurality of food surfaces past a first location;

a dispensing port mounted above the first location;

valve means having an input port and first and second output ports, the valve means including at least one valve for each lane with the dispensing port for each valve being positioned above each lane for dispensing thixotropic food when the valve is in an "on" condition;

flow conducting means connecting the input port to the source means to receive a supply of the thixotropic food therefrom, the first output port connected to the dispensing port to deposit the thixotropic food on the plurality of food surfaces as they pass through the first location;

first return means connected to the second output port and to the source means to provide a first path to return excess thixotropic food to the source means and to provide continuous motion of the thixotropic food through the valve means; and second return means connected to the flow conducting means and to the source means to provide a constant second path independent from the first path to return excess thixotropic food to the source means and to provide continuous motion of the thixotropic food in the flow conducting means, the provision of continuous motion operating to overcome the thixotropic tendency to resist motion;

speed detecting means for producing a signal indicative of the speed of the conveyor;

position detecting means for producing a signal indicative of the position of the food surfaces with respect to the dispensing ports;

computer means capable of receiving the signals indicative of position and speed and operable to open and close the valve means to control the flow of thixotropic food from the dispensing ports on to the food surfaces;

means for producing a signal indicative of a size of the food surfaces;

means for producing a signal indicative of the number of lanes of food surfaces on which thixotropic food is to be dispensed; and connecting means in communication with the computer means for connecting the computer means to receive the signals indicative of the size of the surfaces and number of lanes so as to modify the operation of the valves to assure all of the surfaces receive a proper amount of thixotropic food.

4. Apparatus according to claim 3 wherein the means for producing a signal indicative of the size of the food surfaces includes a plurality of predetermined pattern masks producing outputs representing predetermined surface sizes and switch means connecting a selected pattern mask signal to the valves to adjust the operation of the valves in accordance with the size of a selected food surface.

5. Apparatus according to claim 4 further including means connecting the computer means to the conveyor mechanism to control the speed thereof.

6. Apparatus according to claim 5 further including positive displacement pump means connected between the source means and the valves to provide continuous flow of thixotropic food thereto.

7. Apparatus according to claim 6 further including back pressure means for applying a back pressure to the thixotropic food in the pump means to assure that a sufficient quantity of thixotropic food is supplied to the valves.

8. A dispensing system for applying thixotropic food onto food surfaces comprising a plurality of orifices connected through a plurality of valves to a source of thixotropic food, a variable speed conveyor mechanism for moving food surfaces in one or more lanes under the orifices, detector means producing an output indicative of the position of a food surface with respect to the orifices, speed detecting means for producing a signal indicative of the speed of the conveyor mechanism and computer means receiving the signals indicative of position and speed and operable through a valve actuator to open and close the valves to control the flow of thixotropic food from the orifices onto the food surface, comprising:

means for producing a signal indicative of a size of the food surfaces;

means for producing a signal indicative of the number of lanes of food surfaces on which thixotropic food is to be dispensed; and means connecting the computer means to receive the signals indicative of size and lanes and to modify the operation of the valves to assure all of the food surfaces receive the proper amount of thixotropic food.

9. Apparatus according to claim 8 wherein the means for producing a signal indicative of the size of the food surfaces includes a plurality of predetermined pattern masks producing outputs representing predetermined surface sizes and switch means connecting a selected pattern mask signal to the valves to adjust the operation of the valves in accordance with a selected food surface size.

10. Apparatus according to claim 8 further including means connecting the computer means to the conveyor mechanism to control the speed thereof.

11. Apparatus according to claim 8 further including positive displacement pump means connected between the source of thixotropic food and the valves to provide continuous flow of thixotropic food thereto.

12. Apparatus according to claim 11 further including back pressure means for applying a back pressure to the thixotropic food in the pump means to assure that a sufficient quantity of thixotropic food is supplied to the valves.

13. Apparatus for dispensing a thixotropic food onto a plurality of food surfaces arranged to move under a dispensing position and to assure continuous motion of the thixotropic food to prevent flow change due to the thixotropic property of the thixotropic food comprising:

positive displacement pump means connected to a supply of thixotropic food to move the thixotropic food therefrom to a first output;

valve means having "on" and "off" conditions and an input connected to the first output to receive the thixotropic food, the valve having a dispensing port located at the dispensing position to deposit thixotropic food onto a food surface thereunder when the valve is in the "on" condition and the valve having a first return port connected to return thixotropic food to the supply when the valve is in the "off" condition to assure continuous motion of the thixotropic food and a second return port connected between the output and the supply to constantly return thixotropic food to the supply independently from the first return means when the valves are in both the "on" condition and "off" condition to further assure continuous motion of the thixotropic food, wherein the second return port includes flow restriction means to provide a back pressure to assure continuous flow to the valve means;

conveyor means operable to move the food surface to the dispensing position;

position sensing means operable to produce a signal indicative of the position of the food surface with respect to the dispensing position;

computer means capable of receiving the signal indicative of position and operable to control the "on" condition of the valve means in accordance therewith;

connecting means connecting the conveyor means to the computer means so that the speed of the conveyor means is controlled by the computer means;

speed sensing means in communication with the computer means to produce an output signal indicative of the speed of the conveyor means and to supply the output signal to the computer means; and food surface and thixotropic food sensing means for supplying an output signal indicative of the number of food surfaces and the quantity of thixotropic food and connecting it to the computer means.

14. Apparatus according to claim 13 further including memory means connected to the computer means to store the information indicative of the number of food surfaces and the quantity of thixotropic food.

* * * * *